United States Patent [19]

Blanchard

[11] 3,791,216

[45] Feb. 12, 1974

[54] PIEZOELECTRIC DRIVEN UNLOADED PRESSURE SENSOR

[75] Inventor: William C. Blanchard, Baltimore, Md.

[73] Assignee: The Bendix Corporation, Southfield, Mich.

[22] Filed: Sept. 25, 1972

[21] Appl. No.: 292,217

[52] U.S. Cl. .............................. 73/398 R, 73/410
[51] Int. Cl. ............................................. G01l 9/08
[58] Field of Search ........73/398 C, 398 R, 88.5 SD, 73/88.5 BRN, 517 B

[56] References Cited
UNITED STATES PATENTS
3,456,669   7/1969   Lloyd ............................. 73/388 BN Primary Examiner—Donald O. Woodiel

[57] ABSTRACT

A d.c. voltage is applied through a series resistor to a capacitive piezoelectric device which is part of a cantilevered beam. The beam is thus made to deflect from a starting position until it contacts a grounded aneroid cell thereby partially discharging the piezoelectric device so that it moves back slightly toward the starting position sufficiently to break the ground contact. The capacitive piezoelectric device is thus alternately charged and discharged as the beam alternately makes and breaks ground by contact with the grounded aneroid cell. Since the expansion of the aneroid cell is in response to ambient pressure, the beam deflection as well as the voltage impressed across the piezoelectric device are related to ambient pressure.

5 Claims, 1 Drawing Figure

PATENTED FEB 12 1974 3,791,216
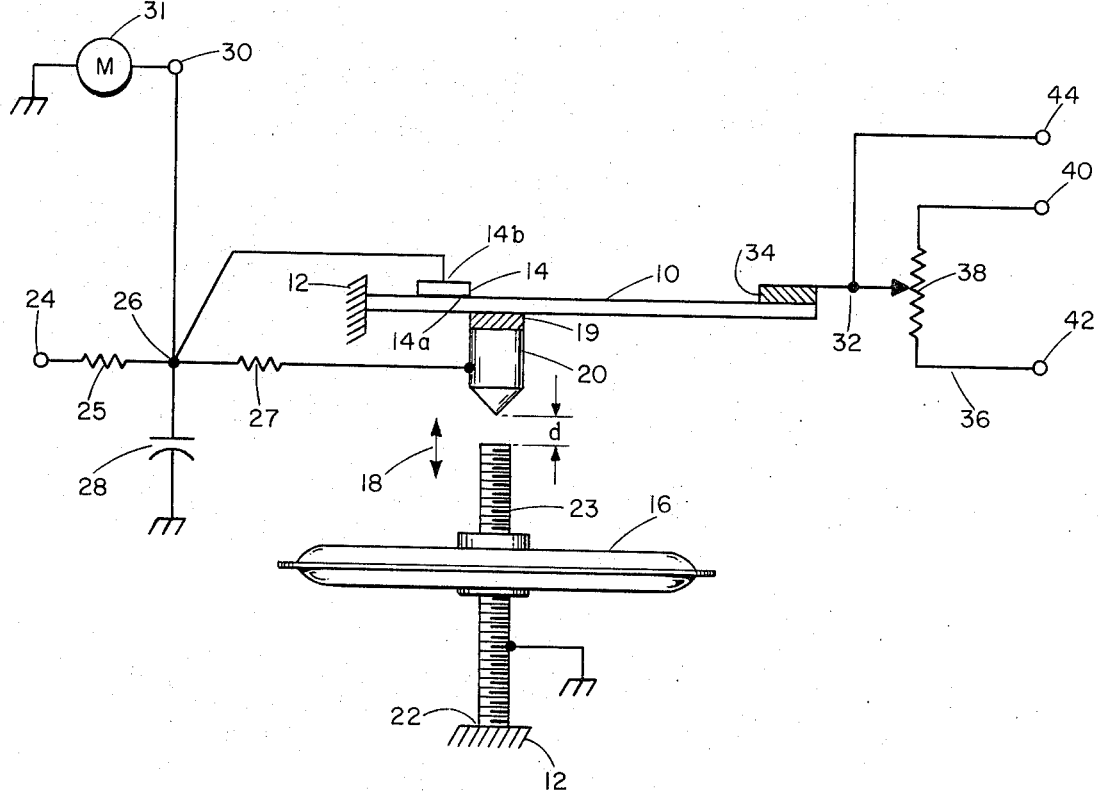

PIEZOELECTRIC DRIVEN UNLOADED PRESSURE SENSOR

BACKGROUND OF THE INVENTION

This invention relates to aneroid pressure cell apparatus of the type used for measuring barometric pressures or elevations. In apparatus of this type the difference in pressure between the inside and outside of the aneroid pressure cell causes the cell to mechanically deflect or otherwise to vary its mechanical extent. This mechanical deflection is generally directly and mechanically utilized for either providing a direct indication of the pressure difference existing across the aneroid cell or used indirectly by a transducer to change the mechanical deflection into an electrical or other type of signal. However, the direct mechanical connection to the aneroid cell requires that some portion, albeit small, of the force developed by the cell through the difference thereacross be used in driving, and hence dissipated in, the mechanical connection to the detriment of measurement accuracy. To overcome this undesirable feature of directly and mechanically utilized pressure cells, non-mechanical utilization means, such as light beams, have been used to maintain the pressure cell in an unloaded condition.

It is an object of this invention to provide an apparatus of the aneroid pressure cell type which includes an indirectly connected mechanical utilization means where the force required to drive the utilization means is obtained from a source which is unrelated to the pressure cell.

According to the invention, a cantilevered beam includes a piezoelectric device, for example, a piezoelectric crystal of the type that flexes when a voltage is impressed thereacross. Thus, when a voltage is impressed across the piezoelectric device, the device and hence the beam deflects.

The beam is positioned over an aneroid pressure cell so that the pressure cell axis of size change in response to changing pressure differentiated thereacross is in the line of action of beam deflection. When the beam deflects sufficiently it makes contact with the pressure cell. The pressure cell is electrically grounded and hence when the beam makes contact therewith the piezoelectric device is grounded through a time constant circuit. The voltage across the piezoelectric device is thus partially discharged to permit the beam to break contact with the grounded cell. The piezoelectric device is thus alternately charged and partially discharged so that the beam remains in close proximity to the grounded pressure cell. As the pressure cell changes size in response to changed differential pressure thereacross, the allowed beam deflection will vary in accordance therewith. Thus, beam deflection as well as voltage across the piezoelectric device will be a measure of the differential pressure across the pressure cell.

A resistor is connected between the power source used for impressing a voltage across the piezoelectric device. In addition, a capacitor is provided to shunt the piezoelectric device if required to provide additional capacitance. A further resistor is provided in the discharge circuit. These resistors and capacitance provide a time constant both for building the voltage across the piezoelectric device and for subsequent discharge of this voltage when the beam contacts the pressure cell as well as for controlling the amount of beam movement.

The beam may now be mechanically or otherwise loaded to provide a measure of pressure cell deflection without actually mechanically loading the pressure cell. Alternately, the voltage across the piezoelectric device may be monitored to provide a measure of pressure cell deflection.

The FIGURE is a modified schematic which illustrates the invention.

DESCRIPTION OF THE PREFERRED EMBODIMENT

Refer to the FIGURE wherein a cantilevered beam 10, shown here in its relaxed condition, is fixedly supported at one end by a relatively immovable structure represented by symbol 12. A piezoelectric device 14, suitably a crystal, is bonded or otherwise fixed to beam 10 so that the axis of crystal flexure in the presence of a voltage thereacross is in the line of beam deflection. A terminal 14a represents the bottom face of crystal 14 and is electrically grounded. If beam 10 is made of an electrically conductive material the immovable structure 12 can be an electrical ground and the crystal electrical ground can be made through beam 10 to structure 12 in the manner well known to those skilled in the art. Otherwise, a separate electrical ground must be made to the bottom crystal face.

An aneroid pressure cell 16 is positioned in the line of deflection of beam 10 which results from crystal 14 flexure in response to voltage thereacross. A beam contact 20 is electrically isolated from the bottom crystal face, for example, by insulator 19. Beam contact 20 is connected to terminal 24 through the serially connected resistors 25 and 27. Terminal 24 comprises the positive terminal of a d.c. voltage source (not shown). The common connection between resistors 25 and 27 is at point 26. This latter point is directly connected to terminal 14b which is the top face of crystal 14. In addition, point 26 is connected through capacitor 28 to electrical ground. The voltage at point 26 may be monitored, for example, at terminal 30.

A pressure cell 16, suitably an aneroid pressure sensing cell, is rigidly fixed at one end 22 to the relatively immovable structure 12. It will be remembered that beam 10 is also fixed at one end to structure 12. Structure 12 is suitably an electrical ground, thus grounding the entire pressure cell 16. In any event, the portion of pressure cell stem end 23 which is touched by contact 20 as beam 10 deflects is maintained at electrical ground. As pressure cell 16 changes size in response to change of pressure thereacross, stem end 23 will move along the line of action parallel to arrows 18, approaching contact 20 when the differential pressure decreases, and retreating from contact 20 when the differential pressure increases. Viewed alternately, the permitted deflection of beam 10 before contact 20 touches stem 23 is greater when the differential pressure across pressure cell 16 is greater, and less when the differential pressure is less.

Assuming that the elements in the FIGURE are at some initial or starting position corresponding to a relatively relaxed position of beam 10 and crystal 14, then the distance d between contact 20 and stem end 23 is related to the differential pressure across pressure cell 16. In operating the device, the positive voltage at terminal 24 is maintained relatively constant so that charges flow therefrom through resistor 25 to point 26, thus causing the voltage between point 26 and ground, which comprises the second voltage source terminal, to rise in accordance with the time constant of the circuit which includes resistor 25, capacitor 28 and crystal 14. As the voltage across crystal 14 rises, the crystal and hence beam 10 will deflect in the direction of pressure cell 16. When contact 20 touches stem end 23 point 26 becomes grounded through resistor 27. The voltage at point 26 thus begins to drop in accordance with the time constant of the discharge circuit which includes resistor 27, capacitor 28 and crystal 14. A small drop in the voltage at point 26, that is the voltage across crystal 14, causes the crystal to relax slightly thus permitting beam 10 to move in the direction of its starting position. Of course, as soon as contact between contact 20 and stem end 23 is broken the discharge circuit is opened and the voltage at point 26 will again begin to build, thus moving beam 10 and hence contact 20 into stem end 23. Thus, in its normal operating condition, beam 10 will remain almost fully deflected with contact 20 continuously making and breaking electrical contact with stem end 23.

A quantity related to beam deflection and hence the pressure differential across the pressure cell 16 can be measured by a number of optional means. The voltage at point 26 may be monitored at terminal 30, for example, by an electrical voltmeter 31, this voltage being related to the pressure differential. As another example, a wiper arm 32 may be fixed at a deflecting portion of beam 10 and electrically isolated therefrom for example by an insulator 34. The wiper arm is suitably part of a potentiometer 36 having a resistance element 38 connected across terminals 40 and 42. The wiper arm 32 is electrically connected to a terminal 44. One skilled in the art can easily see the proper placement of voltages at the various potentiometer terminals will provide a measurement of the deflection $d$ and hence a measurement of the pressure differential across pressure cell 16. Other means for determining deflection $d$ should also be obvious to one skilled in the art.

The invention claimed is:

1. A device for producing a signal proportional to pressure differential comprising:

a beam adapted for deflecting along a line of action including a piezoelectric device having first and second terminals and at least mechanically integrated with said beam so that said beam is deflected along said line of action in response to voltage across said first and second terminals;

a source of d.c. voltage having third and fourth terminals;

first electrical means connecting said third terminal to said first terminal of said piezoelectric device;

second electrical means connecting said fourth terminal to said second terminal of said piezoelectric device;

a contact point which moves in response to deflection of said beam by an amount correlated to the deflection of said beam and along said line of action;

third electrical means connecting said first terminal to said contact point;

pressure sensing means which changes its physical extent in response to changes in differential pressure thereacross arranged in said line of action so as to be touched by said contact when said beam deflects, the change of physical extent of said pressure sensing means being correlated to the change in pressure thereacross;

further means electrically connecting the portion of said pressure sensing means so touched with said fourth terminal; and, means for measuring the deflection of said beam.

2. The device of claim 1 wherein said pressure sensing means comprises an aneroid pressure cell having one end connected to a relatively immovable structure and a free end and an axis of physical change, said aneroid pressure cell being arranged so that its axis of physical change substantially coincides with said line of action through said contact so that said contact touches said free end when said beam is deflected.

3. The device of claim 1 wherein said first electrical means comprises a charge circuit having a time constant.

4. The device of claim 1 wherein said third electrical means comprises a discharge circuit having a time constant.

5. The device of claim 1 wherein said means for measuring comprises a utilization means responsive to the voltage across said piezoelectric device.

* * * * *